United States Patent [19]

Weisman

[11] 3,713,175

[45] Jan. 30, 1973

[54] METAL ALLOY CARDIOVASCULAR IMPLANT DEVICE

[75] Inventor: Sidney Weisman, West Caldwell, N.J.

[73] Assignee: Howmedica, Inc., Rutherford, N.J.

[22] Filed: Nov. 19, 1970

[21] Appl. No.: 91,144

[52] U.S. Cl.....................3/1, 3/DIG. 1, 3/DIG. 3, 128/334 R, 75/171
[51] Int. Cl..............................A61f 1/22, A61f 1/24
[58] Field of Search ...3/1, DIG. 1, DIG. 3; 128/92 R, 128/92 C, 92 CA, 334 R, 334 C; 75/171

[56] References Cited

FOREIGN PATENTS OR APPLICATIONS 454,881  10/1936  Great Britain................................3/1

OTHER PUBLICATIONS

"Blood Vessel Tubes–Blakemire–Lordtype," Vitallium Surgical Appliances Catalog Austenal Laboratories, Inc., 1948, page 22.

"The Influence of the Metal Interface Charge on Long-Term Function of Prosthetic Heart Valves" by P. N. Sawyer et al., Prosthetic Heart Valves, Editor-in-Chief–Lyman A. Brewer, III, M.D., Charles C. Thomas, Publisher pages 198–219, 1968.

Primary Examiner—Richard A. Gaudet
Assistant Examiner—Ronald L. Frinks
Attorney—Pennie, Edmonds, Morton, Taylor & Adams

[57] ABSTRACT

A prosthetic device for surgical implantation within the cardiovascular system of an animal is constructed of a cobalt-chromium-tungsten-nickel-molybdenum alloy. The device is characterized in that it is non-thrombotic and substantially non-reactive with the chemicals found within the animal when implanted therein.

7 Claims, No Drawings

METAL ALLOY CARDIOVASCULAR IMPLANT DEVICE

This invention relates to prosthetic devices, and more particularly the invention relates to prosthetic devices for implantation in the cardiovascular system of an animal constructed of a cobalt-chromium-tungsten-nickel-molybdenum alloy, which device, due to the physical characteristics of the alloy of which it is constructed is non-thrombotic and substantially inert to the cardiovascular environment of the animal when surgically implanted therein.

Experimentation has shown that there are several important factors which have a rather large influence upon whether or not an implanted prosthetic device will operate successfully for a substantial period of time in the cardiovascular system. Because these prosthetic devices come into contact with numerous liquid chemicals which are found within an animal, e.g., blood components, it is necessary that the device be constructed of a material which is substantially inert to these various chemicals under the conditions, e.g., temperature, pH etc., which exist within an animal body. Furthermore, when a prosthetic device is used as a tube for replacement of an artery or as a valve through which blood will flow, one is confronted with the problem of blood clotting. Thus, the thrombotic characteristics of the material which forms the prosthetic device is of major importance. Unless the material is antithrombotic, the red blood platelets will have a tendency to collect on a surface of the implanted device and form a blood clot. This type of formation can lead to grave complications or even to the death of the animal.

In recent years various materials including various metals, metal alloys and plastics have been tested for their use a prosthetic device in cardiovascular systems. While several of these materials, notably certain metals, are well suited for use in prosthesis or fixation appliances they do not possess the dual properties of high corrosion resistance and antithrombotic characteristics, which are required when the device is to be implanted in the cardiovascular system. For these reasons several cobalt base alloys and chromium-nickel stainless steels have been rejected for this purpose. Plastics have been used extensively, but they have relatively low strength and hardness and may for that reason be relatively short-lived, even when their properties are otherwise acceptable. The metals which have been used heretofore as cardiovascular implants generally have superior corrosion resistance with high clotting formation or low clotting formation with poor corrosion resistance.

It is, therefore, the principal object of this invention to overcome the disadvantages of the materials stated hereinabove by providing a prosthetic device for implantation within an animal characterized by the device being non-thrombotic and substantially non-reactive with the chemicals within the animal when implanted therein and which device has a life span in excess of 20 years.

The present invention contemplates constructing a prosthetic device of an alloy comprising the following elements:

| Element | Percent by Weight |
| --- | --- |
| Chromium | 22–25 |
| Tungsten | 7–8 |
| Nickel | 4.9–6.0 |
| Molybdenum | 2.4–3.0 |
| Manganese | 0.90–1.25 |
| Silicon | 0.50–1.20 |
| Iron | 0.40–0.80 |
| Carbon | 0.17–0.24 |
| Cobalt | Balance |

By constructing a device of such alloy the shortcomings and inadequacies of the prior art devices have been substantially overcome when the device is surgically implanted within an animal.

The antithrombotic and corrosion resistant characteristics of the alloys specified above have been ascertained by implantations of (i) tubes in the thoracic inferior vena cava of dogs and (ii) valves in the tricuspid annuli of calves. Essentially, the allows were used in two conditions; in the as-cast condition and in the solution treated condition. The solution treatment involved heating the alloy at a temperature at which carbide constituents go into solution in the metal matrix, followed by rapid cooling.

Several of the alloy tubes were implanted in the thoracic inferior vena cava of dogs in both the as-cast and heat treated conditions. Examples of the excellent results which were obtained by using the alloys of the present invention are as follows: One dog has been living with an implanted tube for substantially 2 years and is in excellent health. Six months after implantation of the tube the dog gave birth to nine puppies. A second dog has been living with an implanted tube for 14 months and is also in excellent health.

Ball valves formed of the above — specified cobalt—chromium base alloy were surgically implanted in the tricuspid annuli of several calves. Four calves have been alive for periods ranging from ten to 12 months. The calves are in excellent health and have been growing at a normal rate. None of the calves have developed ascites or pneumonia. In three cases where death occurred with the implanted valves, and the valves were then removed and examined, no thrombus deposits were found on the valves. In all three instances, death was due to other causes than the implants. The valves of the calves that died were examined for corrosion due to the body chemicals. Substantially none was found.

Generally, thrombus will deposit on the surface of implanted metal prostheses when the potential of the metal is more positive than about + 200mv. (Standard Hydrogen Electrode reference). Therefore, if the metal maintains a potential negative to approximately + 200mv., then it tends to be thrombotic resistant. Since oxide on a metal surface tends to make the potential more positive, it is preferable to remove substantially all oxide from the surface of the prosthetic device prior to implanting the device within an animal. Advantageously, prior to implantation within an animal, the prosthetic device is subject to an acid treatment using a reducing acid to remove substantially all oxide from the surface thereof. Any of the well known reducing acids can be used. For example, hydrochloric acid is eminently suitable for this purpose.

I claim:

1. A prosthetic device for surgical implantation within the cardiovascular system of an animal characterized in that the device is non-thrombotic and substantially non-reactive with the chemicals within the animal when implanted therein, said device being constructed of an alloy comprising the following elements:

| Elements | Percent by Weight |
| --- | --- |

| Element | Percent |
|---|---|
| Chromium | 22–25 |
| Tungsten | 7–8 |
| Nickel | 4.9–6.0 |
| Molybdenum | 2.4–3.0 |
| Manganese | 0.90–1.25 |
| Silicon | 0.50–1.20 |
| Iron | 0.40–0.80 |
| Carbon | 0.17–0.24 |
| Cobalt | Balance |

2. A prosthetic device according to claim 1 wherein said device is a tube.

3. A prosthetic device according to claim 1 wherein said device is a heart valve.

4. A prosthetic device according to claim 1 wherein said alloy is in the as-cast condition.

5. A prosthetic device according to claim 1 wherein said alloy is in the solution heat treated condition.

6. In a method for implanting a prosthetic device within the cardiovascular system of an animal the device characterized by being non-thrombotic and substantially non-reactive with the chemicals of the animal when surgically implanted therein, the steps comprising treating said device with a reducing acid prior to implantation to remove substantially all of the oxide from the surface thereof, said device being constructed of an alloy comprising the following elements:

| Elements | Percent by Weight |
|---|---|
| Chromium | 22–25 |
| Tungsten | 7–8 |
| Nickel | 4.9–6.0 |
| Molybdenum | 2.4–3.0 |
| Manganese | 0.90–1.25 |
| Silicon | 0.50–1.20 |
| Iron | 0.40–0.80 |
| Carbon | 0.17–0.24 |
| Cobalt | Balance |

7. A method according to claim 6 wherein said reducing acid is hydrochloric acid.

* * * * *